United States Patent [19]
Haydock

[11] 3,935,469
[45] Jan. 27, 1976

[54] POWER GENERATING PLANT

[75] Inventor: James Livesey Haydock, Toronto, Canada

[73] Assignee: Acres Consulting Services Limited, Toronto, Canada

[22] Filed: Jan. 29, 1974

[21] Appl. No.: 437,710

[30] Foreign Application Priority Data
Feb. 12, 1973  United Kingdom.................. 648/73

[52] U.S. Cl. ..................... 290/52; 60/39.14; 290/2; 60/39.02
[51] Int. Cl.².. F01D 15/10; F02C 7/02; H02K 7/18; H02P 9/04
[58] Field of Search ...... 290/52, 2; 60/39.14, 39.02, 60/39.03

[56] References Cited
UNITED STATES PATENTS

| | | | |
|---|---|---|---|
| 3,643,426 | 2/1972 | Janelid | 290/52 |
| 3,704,586 | 12/1972 | Bruns | 60/39.14 |
| 3,796,044 | 3/1974 | Schwarz | 290/52 |
| 3,797,234 | 3/1974 | Schwarz | 290/52 |
| 3,801,793 | 4/1974 | Goebel | 290/52 |

Primary Examiner—Robert S. Macon

[57] ABSTRACT

An electrical generating plant comprising a generator which is driven, during on-load periods, by a gas turbine; the gas turbine operates continuously and is powered by a continuous supply of fuel gas from a suitable fuel source and compressed air from an air storage reservoir; the reservoir is recharged periodically from an air compressor driven by the gas turbine during off-load periods only. The air storage reservoir thus serves to store energy supplied by the system during off-load periods and to return that energy to the system during on-load periods, in which the air compressor is inoperative and places no load on the gas turbine.

10 Claims, 4 Drawing Figures

POWER GENERATING PLANT

BACKGROUND OF THE INVENTION

This invention relates to electrical power generating plant.

There is a growing need at the present time for the use of clean fuels in electrical generating plant. This need arises out of the growing concern over the problems of atmospheric pollution, caused primarily by the burning of dirty fuels which are relatively abundant. Sources of fuel having an acceptable degree of cleanliness are available; such fuel sources include, for example, coal gasifier plants and synthetic gas production plants. However, such clean fuel sources involve a very high capital cost, and would be extremely uneconomical to operate except when working at full capacity. Apart from cost considerations, such clean fuel sources cannot easily be regulated to meet the requirements of a variable demand for energy.

These problems associated with presently available clean fuel sources are particularly serious if the fuel sources are to be used with electrical power generating plant, for if the generating plant is required to meet a variable load demand, the fuel source as well as the components of the plant itself must be designed to meet maximum load conditions and the operating cost of the system in off-peak periods (represented by the ratio of the capital cost to the useful power output) may well be prohibitive.

It is an object of the present invention to provide an improved power generating plant in which useful energy is derived from the fuel source continuously despite variations in the load demand on the system.

According to the invention there is provided an electrical generating plant comprising a generator which is driven, during on-load periods, by a gas turbine; the gas turbine operates continuously and is powered by a continuous supply of fuel gas from a suitable fuel source and compressed air from an air storage reservoir; the reservoir is recharged periodically from an air compressor driven by the gas turbine during off-load periods only. The air storage reservoir thus serves to store energy supplied by the system during off-load periods and to return that energy to the system during on-load periods, in which the air compressor is inoperative and places no load on the gas turbine.

In one embodiment of the invention, the generator is adapted to operate as a motor during off-load periods, and so to assist the gas turbine. In this case the motor-generator is powered from an auxiliary generator driven by a steam turbine incorporated in the system. In this way the on-load periods of the system can be extended.

In order that the invention may be readily understood, one embodiment thereof will now be described, by way of example, with reference to the accompanying drawings, in which.

Figure 1:
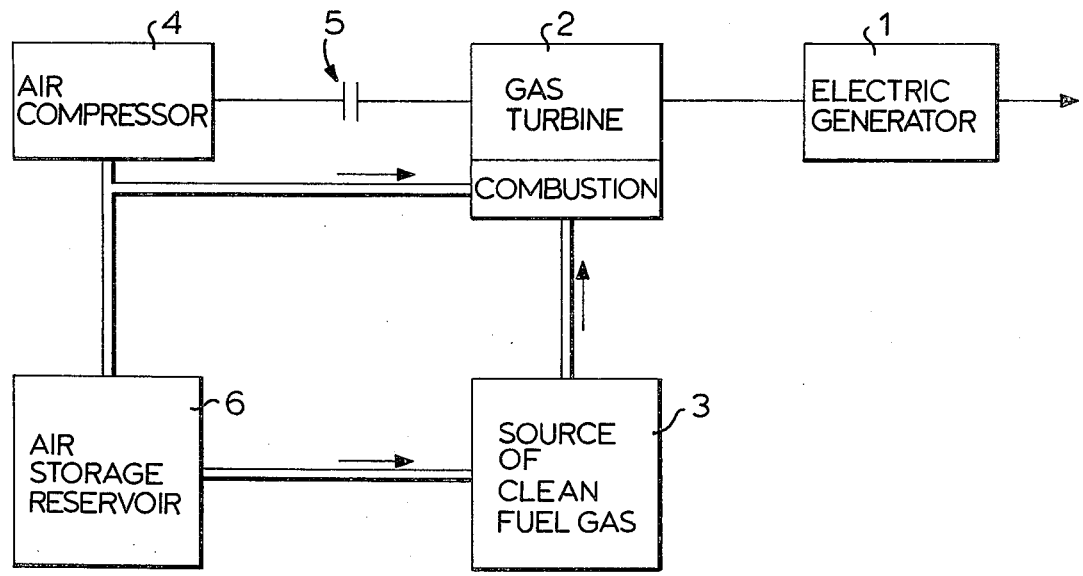
FIG. 1 is a block diagram illustrating the bare essentials of a system according to the invention.

In the system illustrated in FIG. 1, an electrical generator 1 is driven by a gas turbine 2 and supplies electrical power during on-load periods to a load system. Fuel gas for the gas turbine is received from a continuously operated clean fuel source 3, which may be a coal gasifier plant, a synthetic gas production plant, or other similar source of clean fuel. An air compressor 4 is provided for the gas turbine and is arranged to be driven thereby during off-load periods, a disconnectible clutch 5 being provided to provide the driving engagement when required. During on-load periods, however, the air compressor 4 is disconnected from the gas turbine 2, and the latter receives the compressed air necessary for its operation from an air storage reservoir 6, as also does the gasifier plant 3. In this way the power available from the gas turbine for driving the generator is about three times that which would be if the air compressor were driven continuously, for about two thirds of the power of a conventional gas turbine is required for providing the compressed air for its operation. During off-load periods, however, the entire power output of the gas turbine may be used to drive the air compressor 4, the output of which is used to recharge the air storage reservoir 6.

It will be appreciated that the air compressor and the gas turbine would each in practice have a number of stages designed according to well established engineering practice.

Figure 2:
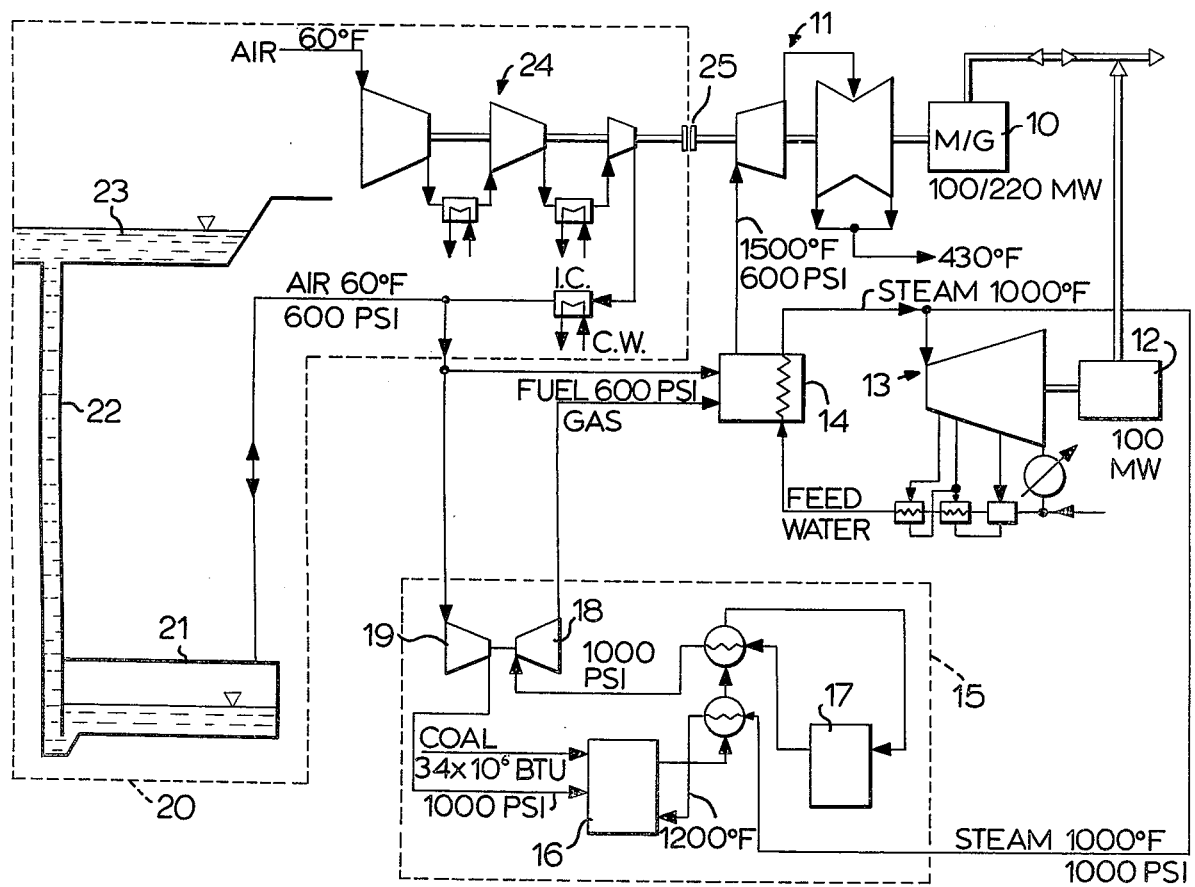
FIG. 2 is a schematic diagram illustrating a combined cycle generating plant embodying the invention and including air storage means and coal gasification plant.

In the embodiment illustrated diagrammatically in FIG. 2, a motor/generator 10 coupled to a gas turbine 11 is driven by the turbine during on-load periods to feed power into a load system, but during off-load periods it received power from an auxiliary generator 12 and assists the gas turbine. The auxiliary generator 12 is driven by a steam turbine system 13 having a steam generator 14.

Fuel gas for the steam generator 14 is produced by a continuously operated clean fuel source 15. The fuel source 15 of this example comprises a pressurized-air coal gasifier 16, producing low b.t.u. gas which is purified in a gas purification plant 17 and after pre-heating expanded in an expansion turbine 18, the latter being coupled to an air compressor 19. The expanded gas, the pressure of which has been stepped down from 1000 p.s.i. to 600 p.s.i. is burned in the combustion chamber of the steam generator 14, the gases of combustion being fed on to the first stage of the gas turbine 11 at a temperature of 1500°F. and a pressure of 600 p.s.i. The coal gasifier 16 receives steam from the steam generator 14, via a reheating stage, and also receives air at a pressure of 1000 p.s.i. from the air compressor 19. The input air of the compressor 19 and the combustion air for the steam generator 14 and turbine system 11 are derived from a compressed air supply system 20 which will now be described.

At the heart of the compressed air supply system 20 is an underground air storage reservoir 21, in which air is stored at about 60°F. and a pressure of 600 p.s.i. The pressure is held fairly constant by means of a water column 22, the upper end of which opens into a pond 23. The height of the water column determines the stored air pressure. Since air is drawn continuously from the reservoir, it is necessary to replenish the air periodically. This is accomplished during off-load periods by means of a multi-stage air compressor 24, the latter being driven by the gas turbine system 11 during off-load periods through a disconnectible clutch 25. As previously mentioned, during such periods, the motor/- generator 10 acts as a motor energized from the auxiliary generator 12 and assists the gas turbine.

Figure 3:
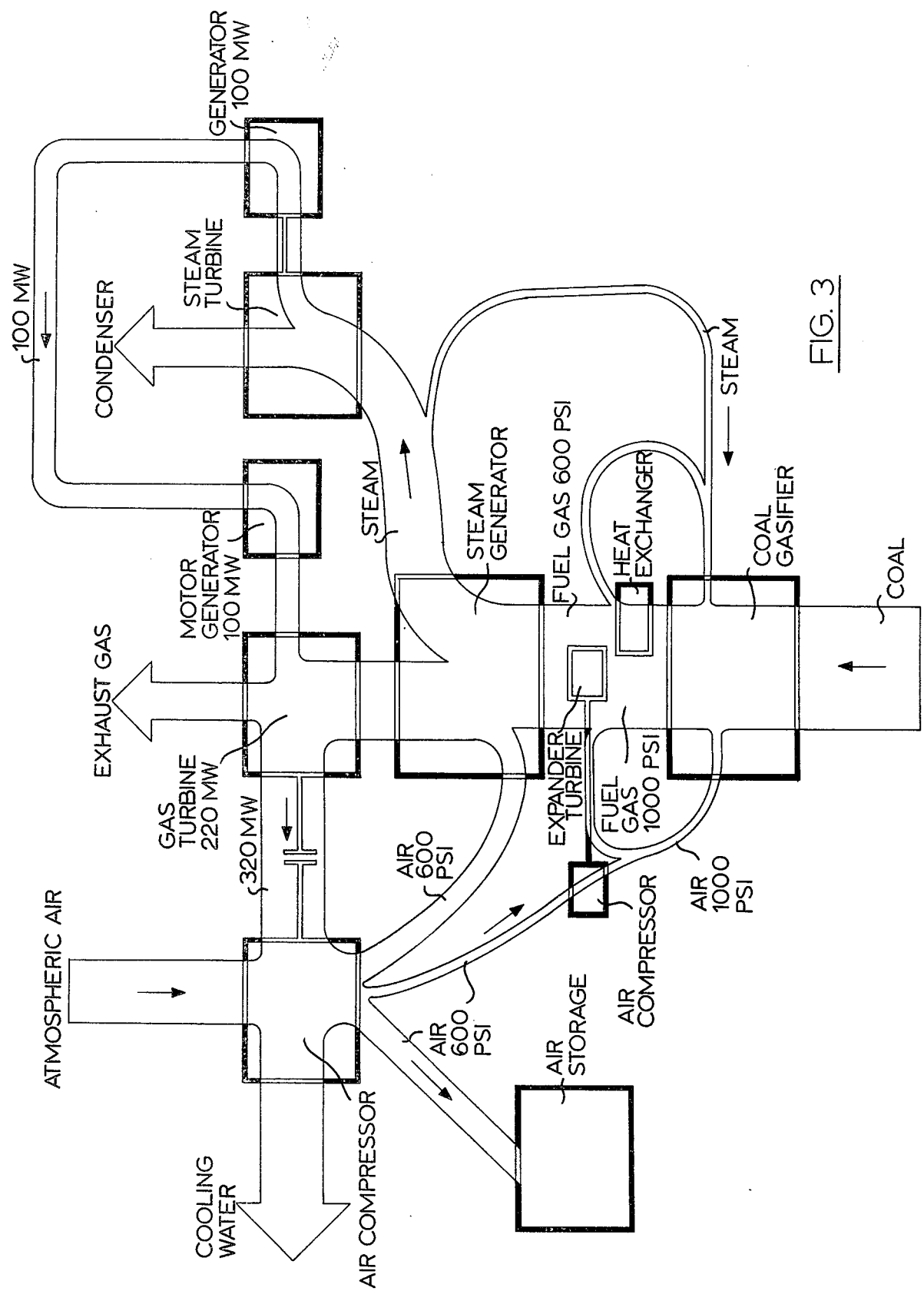
FIGS. 3 and 4 are Sankey diagrams illustrating the energy flow pattern during the "air storage" and "electrical generation" modes, respectively.
Figure 4:
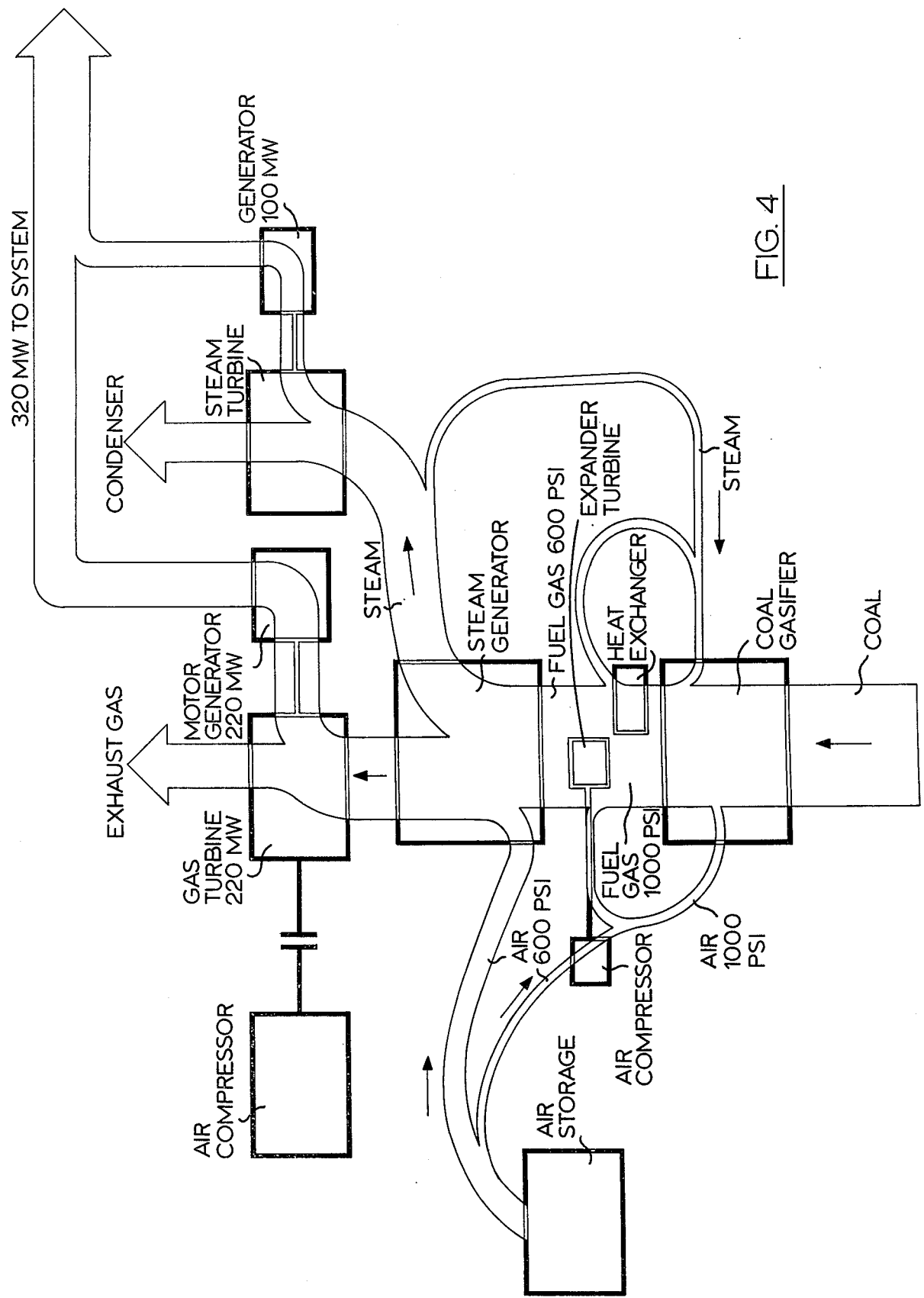

The detailed operation of the system is further explained by the Sankey diagrams of FIGS. 3 and 4.

The second embodiment of the invention is basically similar to that illustrated in FIG. 1, but is characterized by the provision of an auxiliary generator 12 which provides an auxiliary source of electrical power which may be fed back into the system or used to augment the output of the system, the auxiliary generator 12 being driven by a steam turbine 13. It should be noted that the steam turbine 13, unlike a conventional gas turbine system, does not consume a large fraction of its own power output, and unlike the gas turbine 11 does not require a compressed air supply apart from the combustion air supply of the steam generator; the steam turbine therefore provides, at some additional capital cost, an auxiliary source of power to assist the gas turbine in driving the air compressor during off-load periods, and so enabling the on-load periods to be extended. In a practical design of the system for a specific purpose, one would select the respective capacities of the gas turbine and the steam turbine not only according to the maximum load requirements, but also according to the fraction of the total time that the system would be required to be on load.

The steam generator incorporates a high pressure furnace to burn the fuel gas. In the illustrated embodiment it is located ahead of the gas turbine and its exhaust gases are fed to the inlet of the gas turbine at high temperature and pressure to obtain the high efficiency of the combined cycle. In an alternative combined cycle arrangement, not illustrated, fuel is burned in a combustor and hot gas at high temperature and pressure are fed to the gas turbine, the exhaust gases being used to generate steam for the steam turbine in a waste heat boiler.

During the electrical generation portion of the cycle, the air compressor is uncoupled or unloaded and does no work. The compressed air for the coal gasifier and the combustion of fuel in the steam generator is obtained from the underground air storage reservoir or caverns. This is essentially at constant pressure due to the hydrostatic head of water 22. As air is withdrawn, it is replaced by water from the water storage pond via the vertical shafts.

The gas turbine drives the motor/generator as a generator and power is fed out to the electric power system grid. Since there is no compression of air taking place, all of the output of the gas turbine is available for electrical generation and this is about three times that of a conventional gas turbine plant of similar size. The output from the generator of the steam power plant is also fed out to the electrical power system grid during the generation cycle.

During the storage cycle, all the air is shown as being compressed in a manner approaching isothermal. Air for process (steam generator furnace and coal gasifier) may be compressed in a manner approaching the adiabatic with reduced intercooling and aftercooling. This provides air at high temperature for gasification and combustion purposes, thus improving the overall efficiency of the cycle and reducing the amount of heat which must be rejected to the environment.

If secondary energy is from time-to-time available from the electric power system at a lower incremental cost than can be provided by coal gasification, part load operation of the gasifier, steam turbine and gas turbine is possible, the residual energy required for air compression being drawn from the power system.

Although not shown in the drawings, the proposed plant would in practice incorporate a small underground fuel gas reservoir, floating on the fuel gas supply line to the steam generator. This would provide the plant with the necessary flexibility to render operation of the gasifier and purification plant at least partially independent of the fuel consumption rate.

What I claim as my invention is:

1. An electrical power generating plant having alternate generating and energy storage modes of operation, comprising:
   a pressurized-air fuel gasifier for producing a high pressure stream of combustible gas;
   combustion means for combusting said gas to generate a waste gas stream;
   a gas turbine driven by the waste gas stream;
   a main electric generator coupled to the gas turbine to be driven thereby;
   a first air compressor coupled to the gas turbine by coupling means including a disconnectible clutch, the clutch being disengaged during the generating mode of operation and being engaged during the energy storage mode of operation to drive the compressor;
   an underground air storage reservoir connected to the air compressor to receive compressed air therefrom during said storage mode; and
   means for delivering compressed air from the air storage reservoir to the gasifier and said combustion means.

2. An electrical power generating plant having alternate generating and energy storage modes of operation, comprising:
   a pressurized-air fuel gasifier for producing a high pressure stream of combustible gas;
   combustion means for combusting said gas to generate a waste gas stream;
   a gas turbine driven by the waste gas stream;
   a main electric generator coupled to the gas turbine to be driven thereby;
   a first air compressor coupled to the gas turbine by coupling means including a disconnectible clutch, the clutch being disengaged during the generating mode of operation and being engaged during the energy storage mode of operation to drive the compressor;
   an underground air storage reservoir connected to the air compressor to receive compressed air therefrom during said storage mode; and
   a second air compressor connected to receive air from the air storage reservoir and to deliver the air at a higher pressure to the gasifier, said second air compressor being driven by an expansion turbine driven by the combustible gas stream.

3. An electrical power generating plant according to claim 2, wherein the gasifier is a coal gasifier plant.

4. An electrical power generating plant according to claim 2, including a steam generator heated by the combustion of said combustible gas for generating high pressure steam, a steam turbine connected to the steam generator and operated by the high pressure steam therefrom, and an auxiliary electric generator coupled to the steam turbine to be driven thereby.

5. An electrical power generating plant according to claim 4, wherein the main electric generator is a motor generator connected to the auxiliary generator so as to be energized thereby during off-load periods and so assist the gas turbine.

6. An electrical power generating plant having alternate generating and energy storage modes of operation, comprising:
   a pressurized-air fuel gasifier for producing a high pressure stream of combustible gas;
   a steam generator heated by the combustion of said combustible gas for generating high pressure steam, the steam generator discharging a waste gas stream;
   a gas turbine driven by the waste gas stream;
   an electric motor generator coupled to the gas turbine;
   a first air compressor coupled to the gas turbine by coupling means including a disconnectible clutch, the clutch being disengaged during the generating mode of operation and being engaged during the energy storage mode of operation to drive the compressor;
   an underground air storage reservoir connected to the first air compressor to receive compressed air therefrom during the energy storage mode;
   means for delivering compressed air from the air storage reservoir to the steam generator;
   means for delivering compressed air from the air storage reservoir to the gasifier;
   a steam turbine operated by high pressure steam from the steam generator, and
   an auxiliary electric generator coupled to the steam turbine to be driven thereby,
   the motor generator being connected to the auxiliary generator so as to be energized thereby during off-load periods and so assist the gas turbine.

7. An electrical power generating plant having alternate generating and energy storage modes of operation, comprising:
   a pressurized-air fuel gasifier for producing a high pressure stream of combustible gas;
   a steam generator heated by the combustion of said combustible gas for generating high pressure steam, the steam generator discharging a waste gas stream;
   a gas turbine driven by the waste gas stream;
   an electric motor generator coupled to the gas turbine;
   a first air compressor coupled to the gas turbine by coupling means including a disconnectible clutch, the clutch being disengaged during the generating mode of operation and being engaged during the energy storage mode of operation to drive the compressor;
   an underground air storage reservoir connected to the first air compressor to receive compressed air therefrom during the energy storage mode;
   means for delivering compressed air from the air storage reservoir to the steam generator;
   a second air compressor connected to receive air from the air storage reservoir and to deliver the air at a higher pressure to the gasifier, the second air compressor being driven by an expansion turbine connected between the gasifier and the steam generator and driven by said combustible gas stream;
   a steam turbine operated by high pressure steam from the steam generator, and
   an auxiliary electric generator coupled to the steam turbine to be driven thereby,
   the motor generator being connected to the auxiliary generator so as to be energized thereby during off-load periods and so assist the gas turbine.

8. An electrical power generating plant according to claim 7, wherein the gasifier is a coal gasifier plant.

9. A method of operating an electrical power generating plant comprising an electrical generator driven by a gas turbine plant, to meet a variable load demand, which method comprises:
   providing an underground air storage reservoir constituting a source of pressurized air,
   continuously generating a high pressure stream of combustible gas from the gasification of fuel in the presence of pressurized air from the reservoir,
   combusting said gas in the presence of pressurized air from the reservoir to generate heat while producing a waste gas stream,
   utilizing said waste gas stream to drive the gas turbine; and
   i. when the load demand is high, disengaging the air compressor of the gas turbine plant to reduce the mechanical load thereon, and
   ii. when the load demand is low, engaging the air compressor of the gas turbine plant and supplying compressed air from the air compressor to the air storage reservoir.

10. A method according to claim 9, wherein the electrical generator is a motor generator, said method further comprising:
   utilizing the heat of combustion of said gas to generate high pressure steam for driving a steam turbine connected to an auxiliary generator, and
   i. when the load demand is high, feeding power from said motor generator and said auxiliary generator into the load, and
   ii. when the load demand is low, operating the motor generator as a motor receiving power from said auxiliary generator for assisting the gas turbine.

* * * * *